United States Patent
Heubel et al.

(10) Patent No.: US 6,751,468 B1
(45) Date of Patent: Jun. 15, 2004

(54) SYSTEMS AND METHODS FOR PROVIDING PUSH TO TALK FEATURE FOR WIRELESS COMMUNICATION SYSTEMS

(75) Inventors: Michael L Heubel, Marietta, GA (US); Mark D. Austin, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/474,446

(22) Filed: Dec. 29, 1999

Related U.S. Application Data

(60) Provisional application No. 60/136,011, filed on May 26, 1999.

(51) Int. Cl.[7] ............................. H04B 7/00; H04Q 7/20
(52) U.S. Cl. ..................................... 455/518; 455/90.2
(58) Field of Search ............................... 455/507, 502, 455/503, 521, 522, 69, 68, 414, 518, 519, 88, 422, 426, 517–520, 462–464, 90.2, 414.1–414.4, 422.1, 426.1–426.2; 370/432, 442, 468, 278, 312

(56) References Cited

U.S. PATENT DOCUMENTS

| | | | | |
|---|---|---|---|---|
| 3,500,459 A | * | 3/1970 | Battin et al. ................. 455/78 |
| 4,399,555 A | * | 8/1983 | MacDonald et al. ......... 455/450 |
| 4,672,601 A | * | 6/1987 | Ablay ........................ 455/509 |
| 5,511,072 A | * | 4/1996 | Delprat ...................... 455/507 |
| 5,590,399 A | | 12/1996 | Matsumoto et al. ....... 455/33.3 |
| 5,784,028 A | | 7/1998 | Corman et al. ............. 342/357 |
| 5,818,618 A | | 10/1998 | Eastmond .................. 359/163 |
| 5,881,368 A | * | 3/1999 | Grob et al. ................. 455/69 |
| 5,912,931 A | | 6/1999 | Matsumoto et al. ........ 375/340 |
| 5,953,661 A | | 9/1999 | Schwinghammer et al. 455/423 |
| 5,983,114 A | * | 11/1999 | Yao et al. .................. 455/509 |
| 6,233,461 B1 | * | 5/2001 | Chinitz et al. ............. 455/522 |
| 6,449,491 B1 | * | 9/2002 | Dailey ........................ 455/426 |

FOREIGN PATENT DOCUMENTS

| | | | |
|---|---|---|---|
| GB | 2 290 196 A | 12/1995 | ............ H04B/7/26 |
| WO | WO 97/50266 | 12/1997 | ............ H04Q/7/28 |

\* cited by examiner

*Primary Examiner*—Sinh Tran
*Assistant Examiner*—Eliseo Ramos-Feliciano
(74) *Attorney, Agent, or Firm*—Merchant & Gould

(57) ABSTRACT

Systems and methods are provided for allowing a first wireless unit and a second wireless unit to share a single communication channel including a transmit frequency and a receive frequency. The systems and methods allow for a more spectrally efficient transmission of Push To Talk mode calls over a Time Division Multiple Access system. The systems and methods include assigning the single communication channel to the first wireless unit and the second wireless unit, so that the first wireless unit and the second wireless unit may alternatively transmit on the transmit frequency, and the first wireless unit and the second wireless unit may monitor the receive frequency; receiving a first transmission from the first wireless unit on the transmit frequency; sending a signal to the first wireless unit indicating to the first wireless unit to stop transmitting; sending a signal to the second wireless unit that the second wireless unit can send a second transmission on the transmit frequency; and receiving the second transmission from the second wireless unit on the transmit frequency. The systems include a first wireless unit, a second wireless unit, and a base station. The first wireless unit transmits on a transmit frequency of a communication channel and monitors a receive frequency of the communication channel. The second wireless unit monitors the receive frequency.

22 Claims, 9 Drawing Sheets

SYSTEMS AND METHODS FOR PROVIDING PUSH TO TALK FEATURE FOR WIRELESS COMMUNICATION SYSTEMS

This application claims the benefit of Provisional application No. 60/136,011 filed May 26, 1999.

FIELD OF INVENTION

The field of this invention is wireless communication systems and methods of operating the same. More specifically, this invention relates to a system and method for providing a Push to Talk feature with a wireless communication system.

BACKGROUND

The dispatch or Push to Talk ("PTT") feature is a method of communication over a speech circuit, e.g., a wireless unit, in which the talker is required to keep a designated switch operated while talking. The PTT feature is currently offered by some wireless service providers, e.g., the Direct Connect® service from Nextel Communications of Reston, Virginia. Typically, with the PTT feature, a caller must press a designated PTT button while speaking in order to be heard by the called party. The caller is generally heard by the called party in speaker phone mode. The called party then may respond in like manner by pressing a designated PTT button while speaking.

Currently, the PTT feature is most widely offered on Enhanced Specialized Mobile Radio ("ESMR") systems. The PTT feature can be implemented on a Time Division Multiple Access ("TDMA") system such as EIA/TIA standard IS-136, but the implementation of the PTT feature in a IS-136 system is not as spectrally efficient as with an ESMR system. As such, a current IS-136 system is not particularly well suited to handle the PTT functionality. An ESMR system is able to release the selected channel when no one is speaking during a PTT conversation, thereby allowing other users to utilize the channel.

With IS-136, for any type of call, a wireless unit utilizes a thirty kHz wide communication channel consisting of a frequency pair of signals to communicate with a base station. As shown in FIG. 1, the frequency pair includes an uplink or transmit (TX (F1)) frequency and a downlink or receive (RX (F2)) frequency. The signals are typically separated by the frequency duplex separation (for example, forty-five MHz for cellular transmission) and both transmit voice and control information. This is full duplex transmission. The wireless unit transmits control information such as signal strength and call quality data to the base station and receives control information such as handoff data and other call management information. Currently, the wireless unit holds the communication channel using both the TX and RX frequencies for the entirety of the call to the exclusion of other wireless units. As such, an IS-136 system is not as spectrally efficient as an ESMR system for providing a PTT function. Therefore, there is a need for a more efficient method and system of providing PTT on cellular systems such as TDMA systems.

SUMMARY OF THE INVENTION

Systems and methods are provided for allowing a first wireless unit and a second wireless unit to share a single communication channel including a transmit frequency and a receive frequency. The systems and methods include assigning the single communication channel to the first wireless unit and the second wireless unit, so that the first wireless unit and the second wireless unit may alternatively transmit on the transmit frequency, and the first wireless unit and the second wireless unit may monitor the receive frequency; receiving a first transmission from the first wireless unit on the transmit frequency; sending a signal to the first wireless unit indicating to the first wireless unit to stop transmitting; sending a signal to the second wireless unit that the second wireless unit can send a second transmission on the transmit frequency; and receiving the second transmission from the second wireless unit on the transmit frequency.

The systems include a first wireless unit, a second wireless unit, and a base station. The first wireless unit transmits on a transmit frequency of a communication channel and monitors a receive frequency of the communication channel. The second wireless unit monitors the receive frequency.

As a result of the disclosed systems and methods, a wireless unit in Push To Talk mode does not maintain a whole communication channel, i.e., both the transmit and receive frequency, for the entirety of a Push To Talk call. The systems and methods allow for a more spectrally efficient transmission of Push To Talk mode calls over a Time Division Multiple Access system or similar communication system by allowing two wireless units to share a single communication channel. Because of the increased efficiency, the disclosed systems and methods provide for more economically feasible systems and methods of providing a Push To Talk mode in a communication system.

BRIEF DESCRIPTION OF THE DRAWINGS

The accompanying drawings, which are incorporated in and form a part of the specification, illustrate exemplary embodiments of the present invention and, together with the description, disclose the principles of the invention. In the drawings.

DETAILED DESCRIPTION

Reference will now be made in detail to exemplary embodiments of the invention, non-limiting examples of which are illustrated in the accompanying drawings. While the following description is provided in terms of the EIA/TIA IS-136 TDMA standard, one skilled in the art would recognize that this invention is applicable to other wireless communications systems and protocols.

Figure 1:
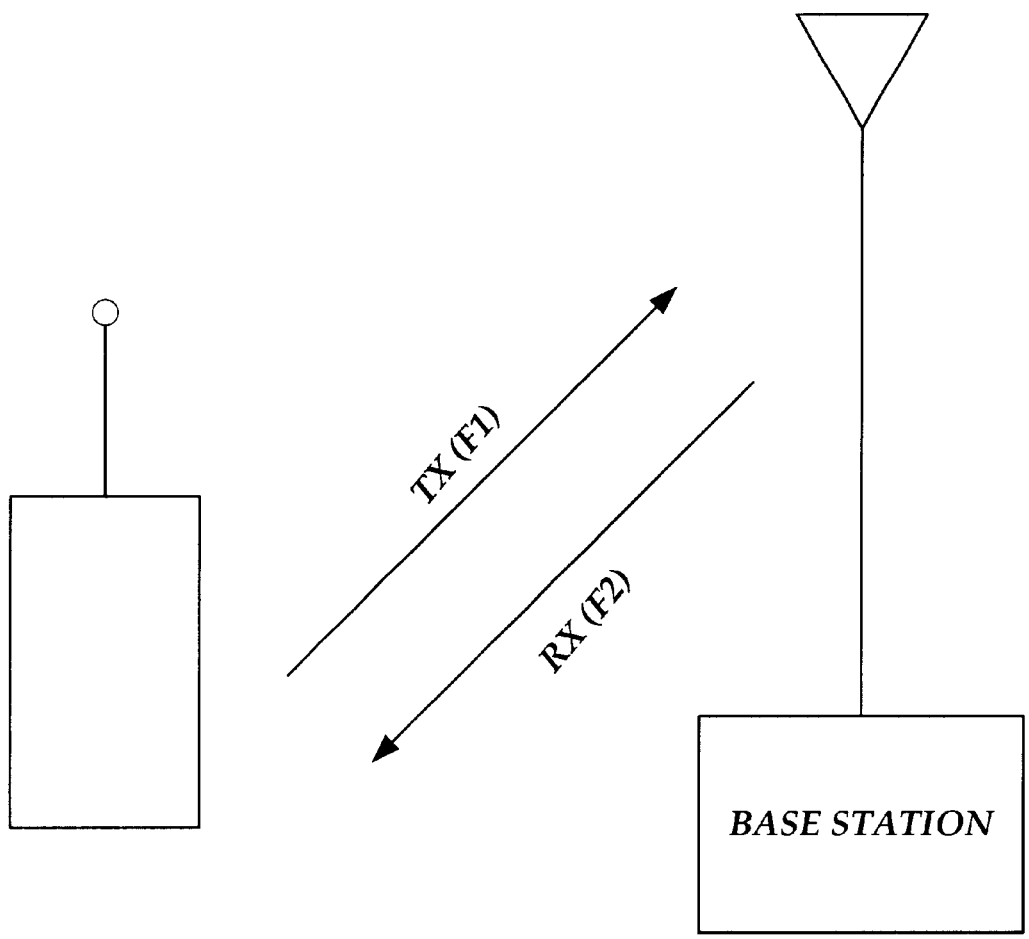
FIG. 1 illustrates a full duplex transmission between a base station and a wireless unit.
Figure 2:
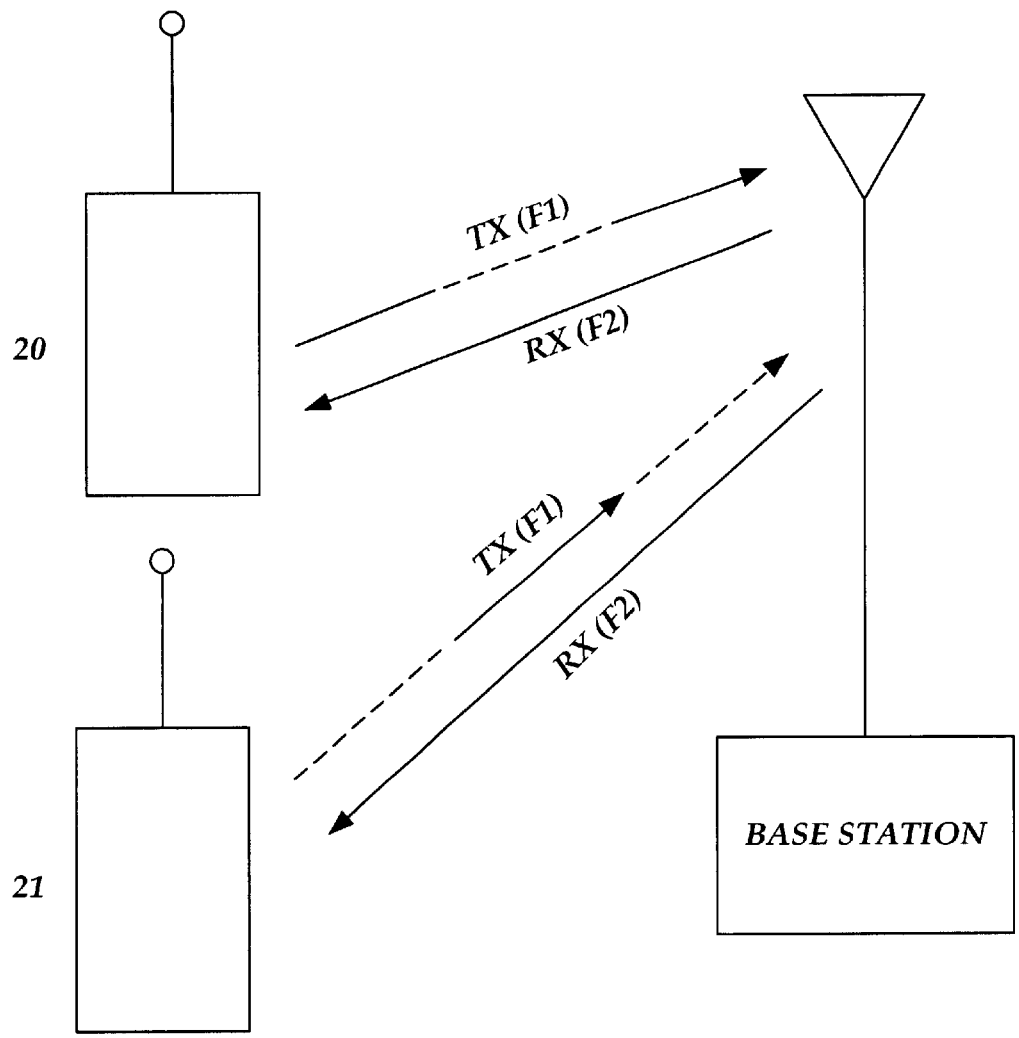
FIG. 2 illustrates an example of the communication channel sharing of the present invention.

FIG. 2 provides an example of communication channel sharing between two wireless units. Wireless includes cellular, Global System for Mobile Communication (GSM), Advanced Mobile Phone Service (AMPS), and other communication systems that operate without the use of wires or operate based on radiowave technology. During a PTT call, a caller mainly uses only one half of the frequency pair of signals that include that designated channel. In order to increase the spectral efficiency during a PTT call, the frequency pair is shared by two wireless units utilizing the same base station, wireless unit 20 and wireless unit 21. In the example shown in FIG. 2, the transmitting wireless unit 20 primarily uses the TX frequency, and the receiving wireless unit 21 primarily uses the RX frequency. However, the transmitting wireless unit 20 needs to receive control information messages from the base station, that may include call quality measurement ("CQM") data, hand off data, and any acknowledgments. The receiving wireless unit 21 needs to transmit control information messages to the base station, that may include Mobile Assisted Handoff Information ("MAHO"). In FIG. 2, wireless unit 20 does not have to communicate with wireless unit 21.

In order to allow the transmitting wireless unit 20 to access control information messages from the base station, transmitting wireless unit 20 and receiving wireless unit 21 both monitor the RX frequency for messages. Control information messages on the RX frequency include an additional field or information element ("IE") in the message that identifies whether the message is for wireless unit 20 or wireless unit 21. While the transmitting wireless unit 20 is transmitting on the TX frequency, wireless unit 20 monitors the RX frequency and decodes any messages with the appropriate IE. Messages such as CQM messages, hand off messages, and all acknowledgments between the base station and the wireless unit have the IE identifying the intended wireless unit.

In order to allow the receiving mobile to report MAHO and other control information to the base station, the transmitting wireless unit 20 stops transmitting long enough for the receiving wireless unit 21 to transmit its control information. The transmission by the receiving wireless unit 21 must be done in such a manner as to avoid conflicts between the transmitting wireless unit 21 and the receiving wireless unit 21. The base station signals the wireless units 20 and 21 when an appropriate time is available for the receiving wireless unit 21 to use the TX frequency. For example, the base station may coordinate the transmit signal with the discontinuous transmission (DTX) low signal. With DTX, the wireless unit reduces it power level when the input level of its modulating signal goes low indicating a break in speech. As such, in this example, at the appropriate time the receiving wireless unit 21 receives a signal from the Dedicated Control Channel (DCCH) indicating that the transmitting mobile 20 is in a DTX-low state and thus, not currently transmitting. The DTX-low signal signals to the wireless unit 21 that it can transmit. The base station is not limited to utilizing the DTX-low state of the wireless unit 20 to signal to the wireless unit 21 that it can transmit. Other methods or signals known to those skilled in the art may be used.

Figure 3:
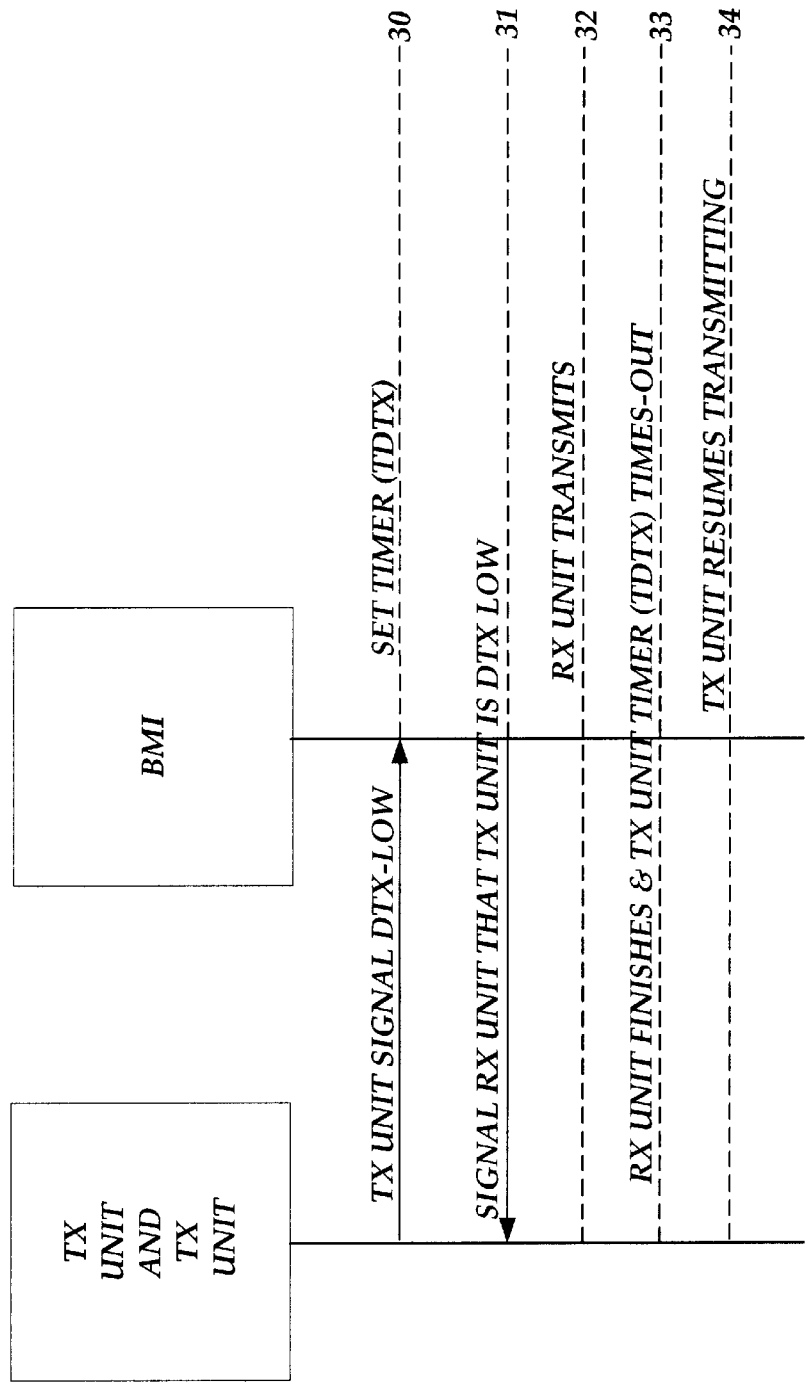
FIG. 3 illustrates one embodiment of the sequence of events for sharing the transmit frequency of the communication channel.

FIG. 3 illustrates an exemplary sequence of events for the sharing of the TX frequency utilizing the DTX-low signal. At event 30, the transmitting wireless unit (TX unit) signals an activity state change indicator ("ASCI") via a fast associated control channel ("FACCH") message to the base station—mobile switching center interworking (BMI) that TX unit has transitioned to DTX-low. The BMI includes a base station and an associated mobile switching center. Timer (Tdtx), which signifies a minimum time that the transmitting wireless unit must stay within the DTX-low state, is also set at event 30. The Tdtx timer is set to avoid collisions with the receiving wireless unit (RX unit) when the RX unit starts transmitting on the TX frequency. At event 31, the RX unit receives a signal from the BMI that the TX unit has transitioned to DTX-low state and the TX frequency can be utilized if needed. In one embodiment, the signaling utilized is a digital voice color code ("DVCC") flip which consist of a change in the DVCC bits in such a manner that is preknown and can be reliably detected in one frame. At event 32, if the RX unit has information that it needs to convey to the BMI, the RX unit transmits on the TX frequency for no more than the number of frames that are left from the Tdtx timer. At event 33, the RX unit finishes transmitting and the TX unit's Tdtx timer times out. At event 34, the TX unit resumes transmitting on the TX frequency. In FIG. 3, the TX unit does not necessarily communicate with the RX unit.

Figure 4:
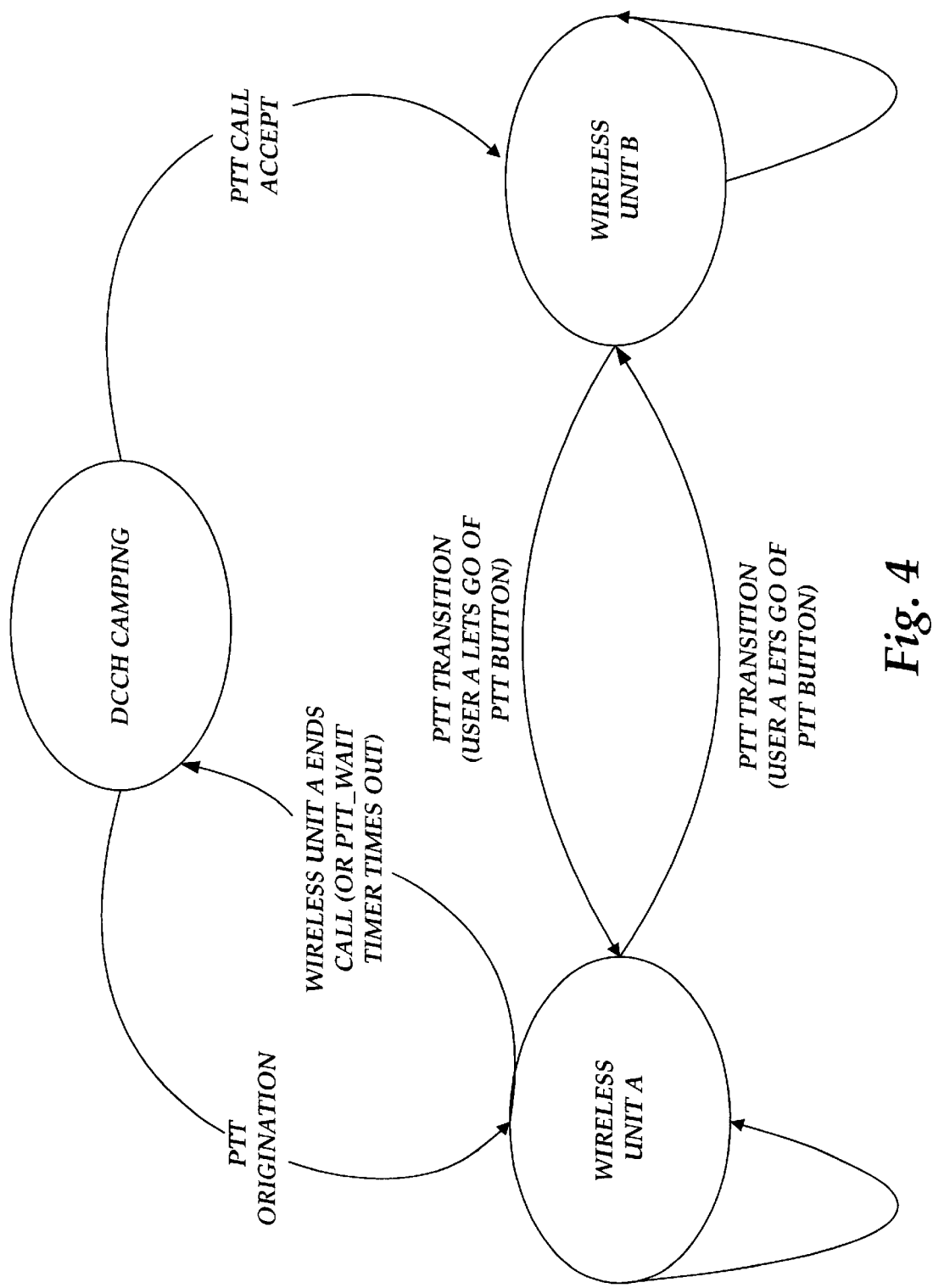
FIG. 4 illustrates a state diagram of one embodiment of the communication channel sharing of the present invention.

FIG. 4 illustrates a state diagram of an exemplary embodiment of the PTT call flow between wireless unit A and wireless unit B. In FIG. 4, the user of wireless unit A is communicating with the user of wireless unit B. Wireless unit A and wireless unit B are not necessarily utilizing the same base station or same mobile switching center.

Figure 5:
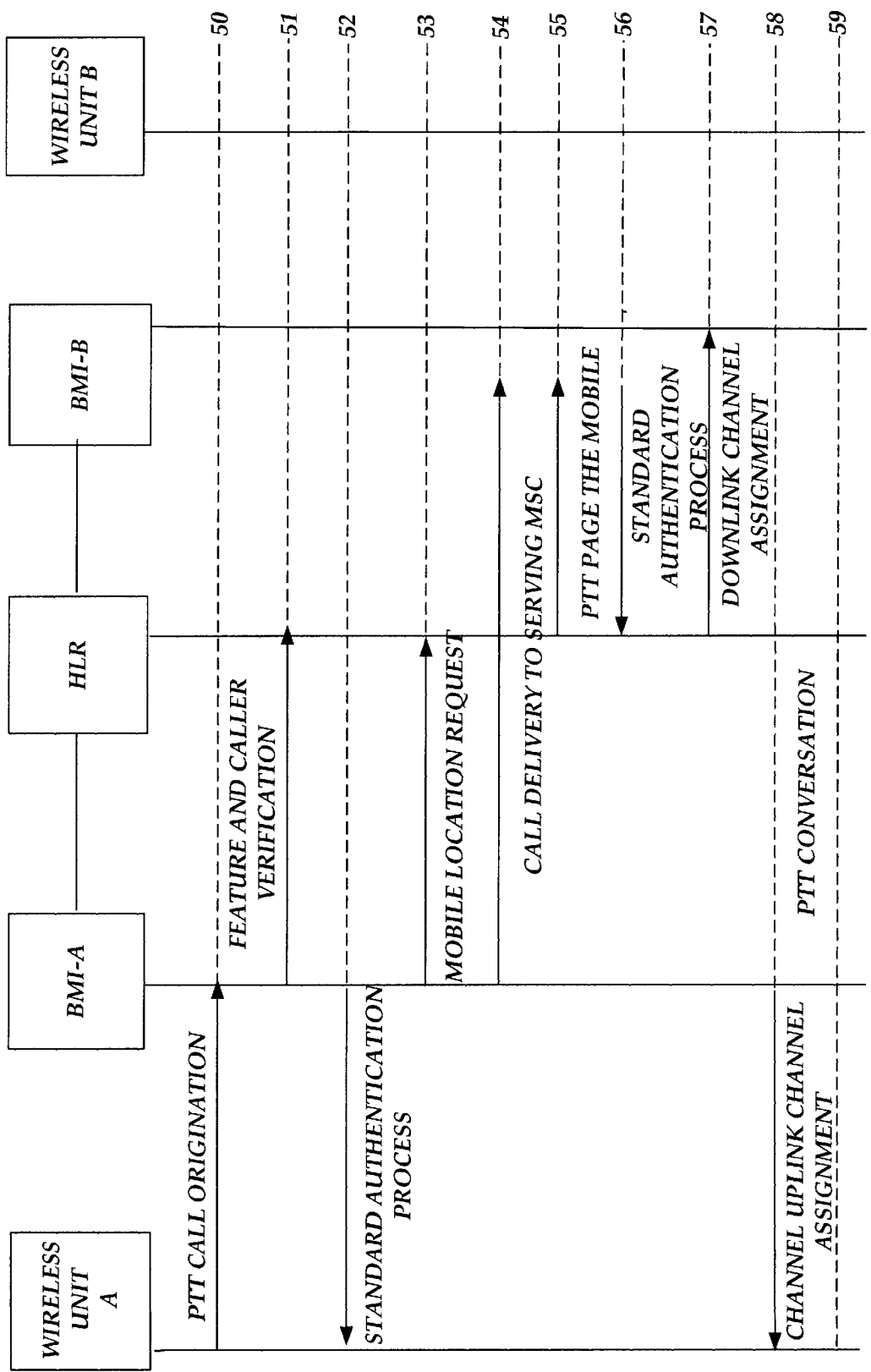
FIG. 5 illustrates one embodiment of the sequence of events for a successful call origination.
Figure 7:
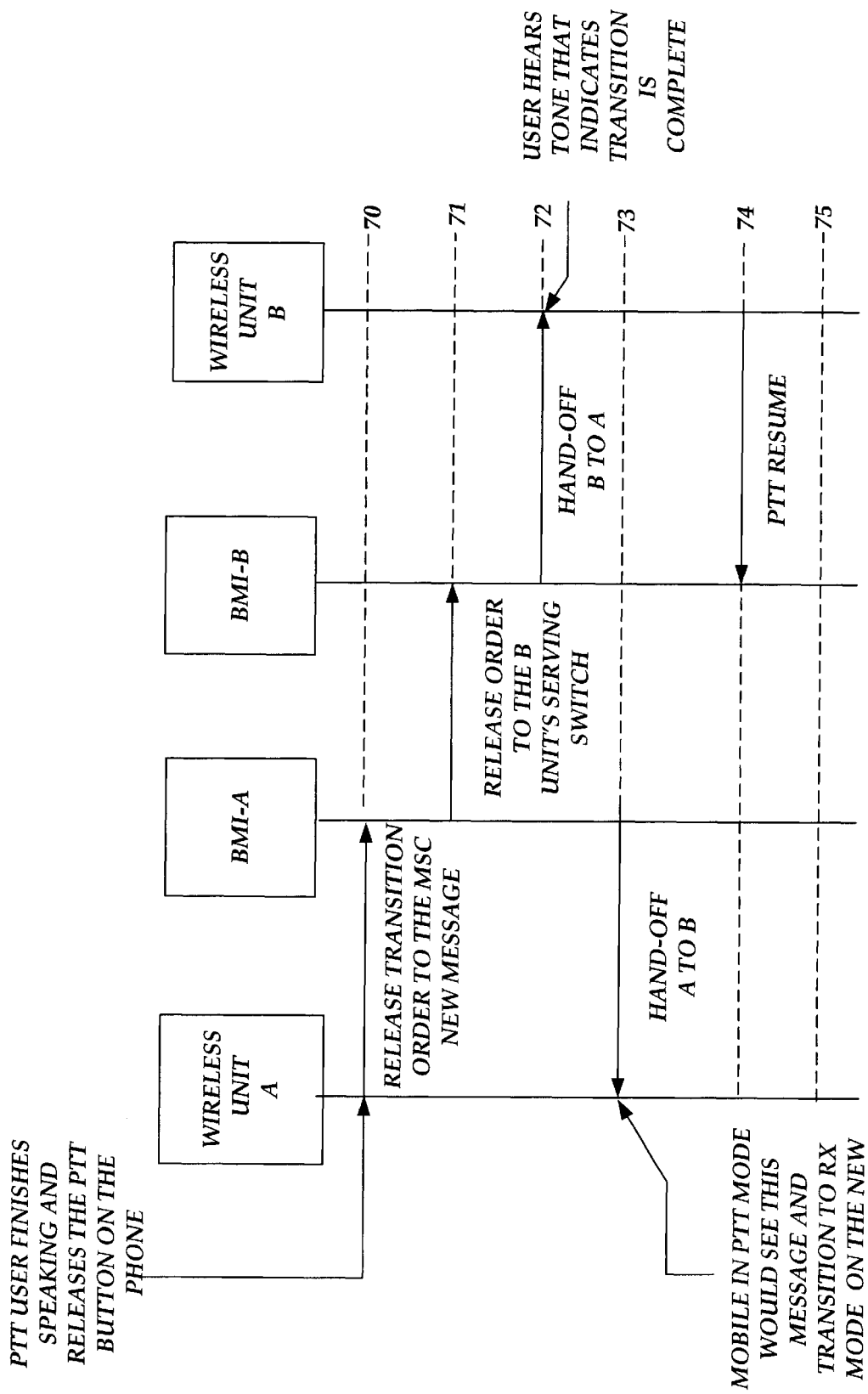
FIG. 7 illustrates one embodiment of the sequence of events for the transition of the wireless units from transmitting to receiving and receiving to transmitting.

FIG. 5 illustrates a successful PTT call origination between wireless unit A using BMI-A and wireless unit B using BMI-B. At event 50, a PTT call origination message is sent from the calling wireless unit, wireless unit A, to the transmitting BMI, BMI-A. As with a regular call, for a PTT call the wireless unit A camps and originates calls on the DCCH. To make a PTT call, a user enters the number on the wireless unit A like a normal call. Rather than pressing the "send" button, a user performs some other function, which indicates that this is a PTT call request. For example, in one embodiment the wireless unit A has a separate PTT button. Pressing and releasing of the PTT button accomplishes two things. First, the wireless unit A begins to operate in the external speaker/microphone mode. This means that any time during the call, the user presses the PTT button to speak. If the user of the wireless unit A releases the PTT button during a call, the transmit function is transitioned to the receiving party as shown in FIG. 7. Second, the press and release action triggers a PTT origination request from the wireless unit A to the BMI-A. BMI-A then verifies the wireless unit A and sets up the call. This origination is identified in this embodiment by the transmitting MSC of the BMI-A via a toggled bit in the origination message. Thus, in this embodiment, a PTT identifying bit is used in the IS-136 origination message.

After the sending of the PTT call origination message of event 50, the overall call origination process proceeds essentially the same as with a normal IS-136 call origination. In event 51, after the wireless unit A originates a PTT call, BMI-A queries the Home Location Register (HLR) for user information and verifies the call identity and PTT feature capability. The HLR can be integral to the transmitting MSC of the BMI-A or it can be separate. During this query, the transmitting MSC retrieves authenticate information from the HLR and creates a Visitor Location Register (VLR). BMI-A and the wireless unit A conduct the standard authentication process in event 52. In event 53, the BMI-A begins the standard mobile locate process by sending a mobile location request for the receiving wireless unit, wireless unit B, to the HLR. In event 54, after the wireless unit B has been located, the transmitting MSC of BMI-A delivers the call to the receiving MSC of the receiving BMI, BMI-B. A PTT call type identifier is included in the message sent from the transmitting MSC to the receiving MSC. At event 55, BMI-B sends an alert to the wireless unit B. The alert is similar to one sent during a regular call, except, for a PTT call, the alert contains call type information that tells the wireless unit B that there is an incoming PTT call. The wireless unit B indicates to the user that there is an incoming PTT call after receiving the alert from BMI-B. In one embodiment, the wireless unit B beeps to indicate to the RX user that there is an incoming PTT call. If the wireless unit B has an automatic answer feature, then the PTT call is automatically accepted. If the wireless unit B does not have an automatic answer feature or if the RX user has the automatic answer feature turned off, then the RX user must accept the call, such as, for example, pressing and releasing the PTT button of the wireless unit B, in order to answer the call. All the same mobile verification is conducted.

At event 56, the standard authentication process is conducted, as outlined in the IS-136 standard. At event 57, after the identity of the wireless unit B has been verified, BMI-B assigns a channel consisting of a frequency pair and time slot to the wireless unit B via a normal DTC designation message. As the wireless unit B is the receiving wireless unit, wireless unit B only utilizes the TX frequency after receiving the appropriate signal from the receiving base station of the BMI-B. Thus, as described above, the wireless unit B monitors the RX frequency, and only uses the corresponding TX frequency to send messages in a coordinated manner to the base station. Once the wireless unit B arrives on the RX frequency and successfully responds to the call, the RX user then hears a signal (e.g. two beeps), which indicates the PTT conversation has begun. This signal tells the user the connection is complete and to wait for incoming voice. At event 58, after the wireless unit B has been located and assigned a channel, the wireless unit A receives its channel assignment via a standard DTC designation message. As described above, the wireless unit A shares the TX frequency with another wireless unit and monitors the RX frequency for messages directed to it. At event 59, the TX user begins speaking in the wireless unit A in PTT mode and the speech is transmitted by the wireless unit A and received by the wireless unit B.

Figure 6:
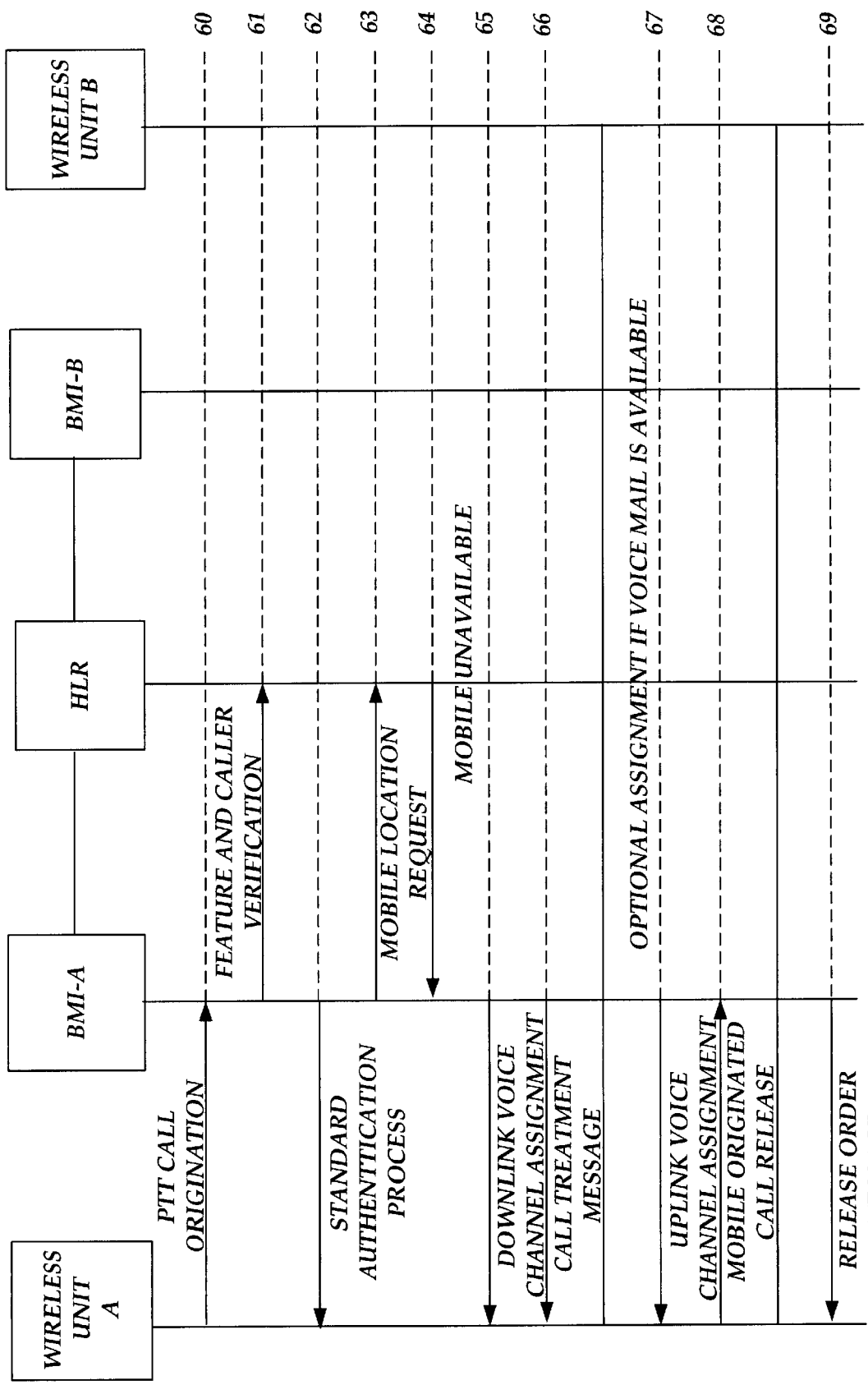
FIG. 6 illustrates one embodiment of the sequence of events for a unsuccessful call origination.

FIG. 6 illustrates an unsuccessful PTT call origination. Events 60 through 63 are the same as events 50 through 53 respectively for a successful PTT call origination as shown in FIG. 5. At event 64, the RX mobile's HLR sends a mobile unavailable response to the BMI-A. There could be three reasons for this response: (1) the user B did not wish to answer the call; (2) the wireless unit B was unavailable or out of the system; or (3) the wireless unit B is already active on a PTT call. The mobile unavailable response is the same as the response used currently. At event 65, the wireless unit A is assigned a channel including a frequency pair by the BMI-A. Because the wireless unit B is unavailable, the wireless unit A is assigned as an RX user and thus does not to transmit. At event 66, the wireless unit A receives a call treatment message from the BMI-A stating that the wireless unit B is unavailable. If the user B has voice mail, the call may be routed to voice mail and a voice mail greeting from the user B may be transmitted to the wireless unit A. At event 67, after the voice mail greeting is received by wireless unit A, the BMI-A assigns the wireless unit A another channel where the wireless unit A is the transmitting mobile. Once the new channel is assigned to the wireless unit A, the user A can transmit a voice mail message to the user B's voice mail.

At event 68, after the user A has completed the voice mail message, the all is terminated by the release of the PTT button on the wireless unit A. The release of the PTT button sends a standard release message to the BMI as outlined in the IS-136 standard. In event 69, if voice mail is unavailable, the BMI sends a release message to the wireless unit A after the call treatment message, indicating that the wireless unit B is unavailable, to the wireless unit A. This message would be the same as the release messages outlined in IS-136 standard.

Handoffs between base stations for the wireless unit A and wireless unit B occur the same as is currently known. The only change is that the handoff message from the base station includes a transition identifier information element. The transition identifier indicates a change in state from transmitting to receiving and vice versa. In a normal handoff, the transition identifier indicates no change in state and thus no transition.

Once the user A finishes speaking and releases the PTT button on the wireless unit A, the user B may wish to speak. FIG. 7 illustrates one example of a normal transition from transmitting wireless unit A to receiving wireless unit A and receiving wireless unit B to transmitting wireless unit B. At event 70, the user A finishes speaking and releases the PTT button on the wireless unit A. The wireless unit A sends a release transition order to the BMI indicating a state change from transmitting to receiving. This message is in the form of a standard mobile release message with a transition identifier information element. After the wireless unit A sends this message, wireless unit A remains on the TX frequency until unit A receives a new channel assignment for a transition to receiving wireless unit. At event 71, a release order is sent from BMI-A to BMI-B. BMI-B then initiates a hand off of the wireless unit B to a new channel where wireless unit B is the primary TX frequency user. At event 72, the wireless unit B transitions to the primary transmitting wireless unit. Once the wireless unit B identifies the transition, wireless unit B notifies the user (e.g., through an audible tone). The receiving wireless unit B is now the transmitting wireless unit B. At event 73, the wireless unit A hands off to the receiving mode, and listens to the RX frequency of the new channel assigned in the hand off message. Once the wireless unit A identifies the transition, wireless unit A notifies the user (e.g., through an audible tone). The transmitting wireless unit A is now the receiving wireless unit A. At event 74, when the user B presses the PTT button on the wireless unit B a PTT resume message is sent from the wireless unit B to BMI-B. This message signals the base station that the user has physically entered the PTT talking mode (e.g. the user has pressed the PTT button on the phone). At event 75, normal PTT call flow takes place.

Figure 8:
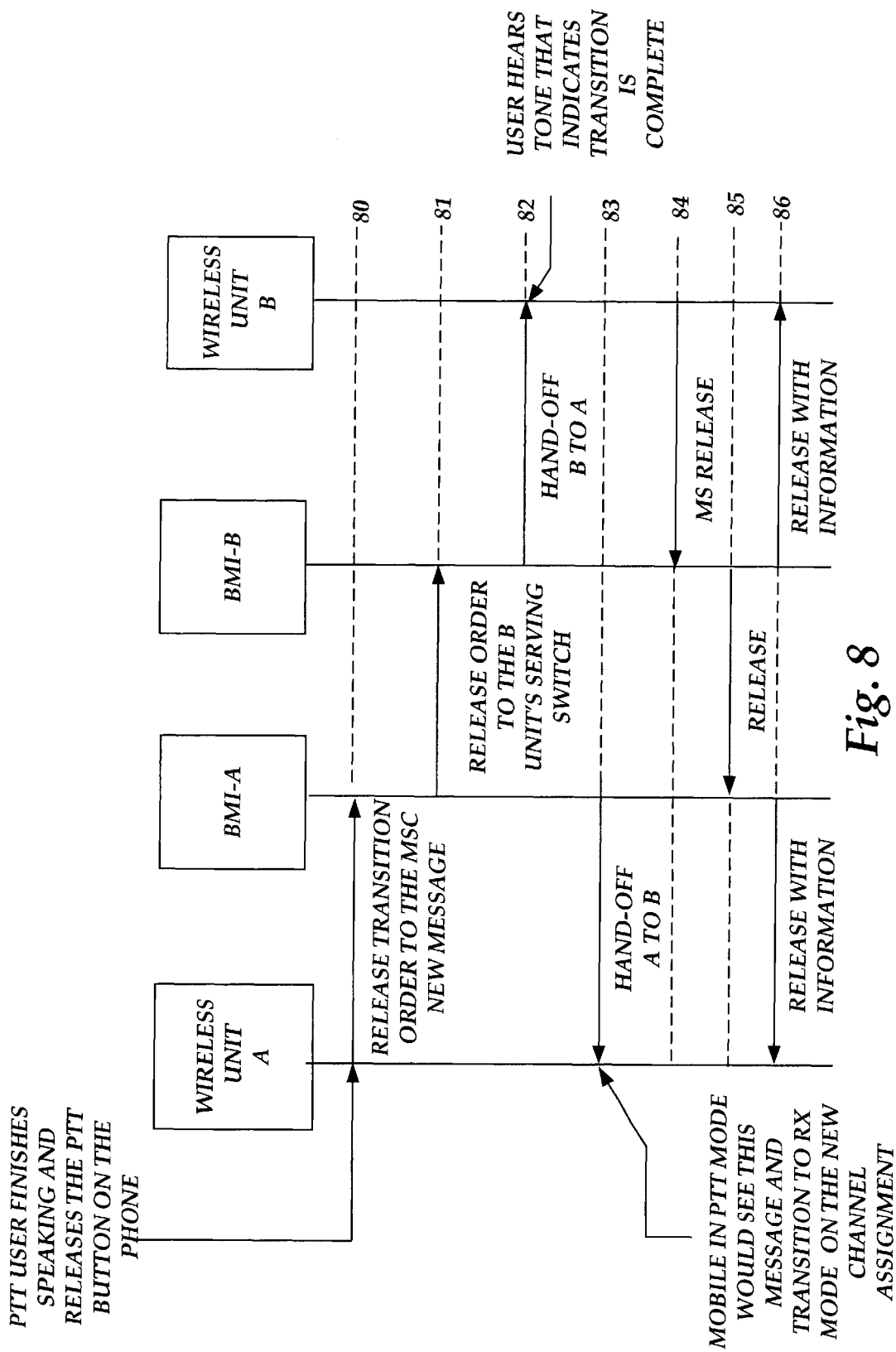
FIG. 8 illustrates one embodiment of the sequence of events for the termination of a call initiated by a wireless unit.
Figure 9:
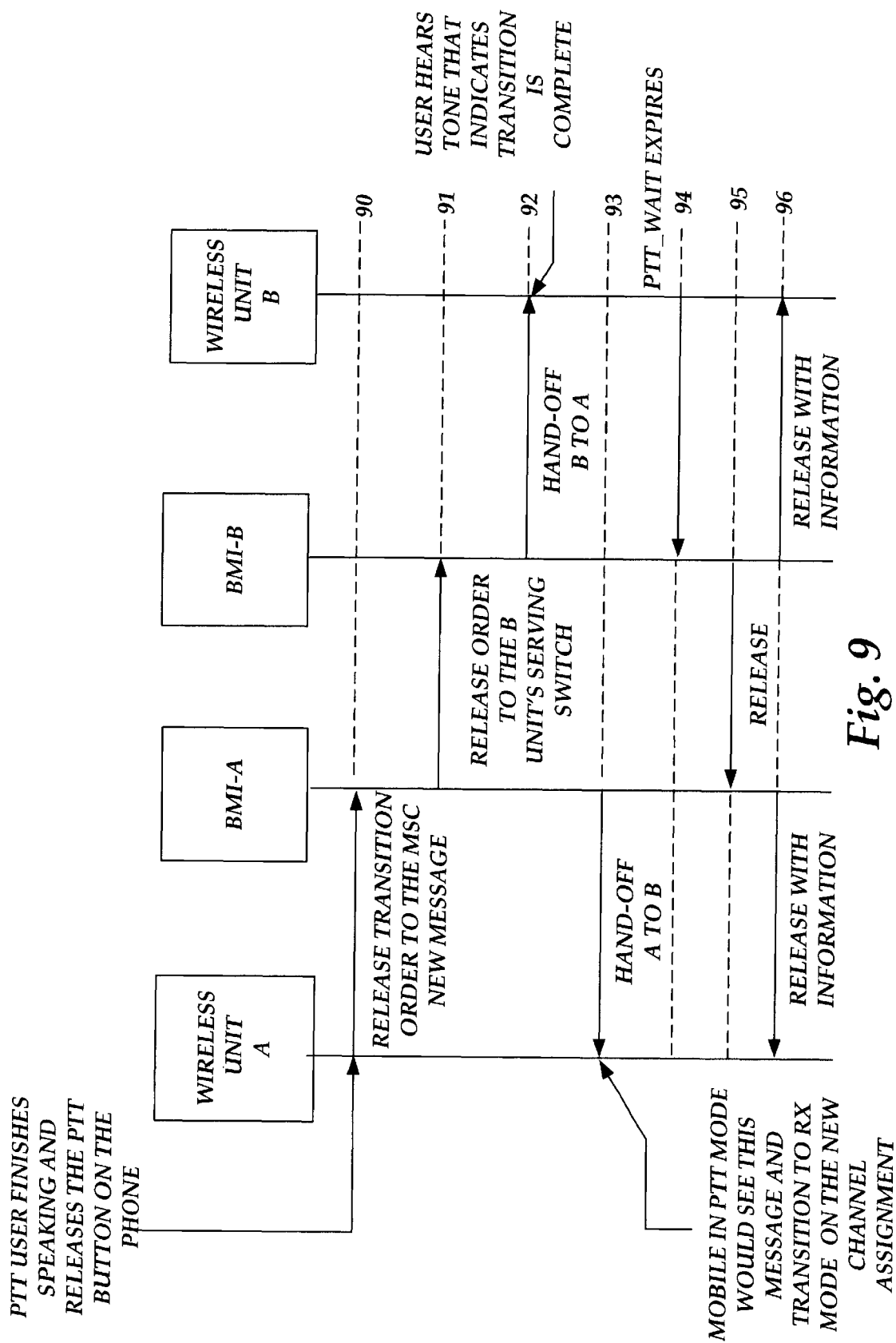
FIG. 9 illustrates one embodiment of the sequence of events for the termination of a call caused by a PTT wait time out.

There are two ways in which the PTT call can be terminated. The termination can be initiated from the wireless unit A as shown in FIG. 8, or the termination can be caused by a PTT wait time out from the BMI as shown in FIG. 9. With respect to FIG. 8, events 80 through 83 are the same as those events 70 through 73 shown in FIG. 7. At event 84, the TX user presses the "end button" and causes an MS release. At event 85, the BMI signals the other BMI that a call end was requested. At event 86, a release is sent from the BMI to the wireless unit A with information to all PTT users that the call has been terminated by the wireless unit A.

With respect to FIG. 9, events 90 through 93 are the same as events 70 through 73 in FIG. 7. At event 94, the BMI did not receive the PTT resume message by the time PTT wait expires. This initiates call termination. Events 95 through 96 of FIG. 9 are the same as events 85 through 86 in FIG. 8.

The foregoing description of exemplary embodiments of the invention has been presented only for the purpose of illustration and description and is not intended to be exhaustive or to limit the invention to the precise forms disclosed. Many modifications and variations are possible in light of the above teaching. The embodiments were chosen and described in order to explain the principles of the invention and their practical applications so as to enable others skilled in the art to utilize the invention in various embodiments and with various modifications as are suited to the particular use contemplated.

What is claimed is:

1. A method in a wireless communications system for allowing a first wireless unit and a second wireless unit to share a single communication channel including a transmit frequency and a receive frequency, comprising:
    assigning the single communication channel to the first wireless unit and the second wireless unit, so that the first wireless unit transmits on the transmit frequency, suspends transmission for a predetermined period of time, and resumes transmission after the predetermined period of time and the second wireless unit transmits on the transmit frequency during the predetermined period of time, and so that the first wireless unit may monitor the receive frequency while transmitting on the transmit frequency and the second wireless unit may monitor the receive frequency; and
    sending a control information message on the receive frequency to the first wireless unit and the second wireless unit for receipt by the first wireless unit or the second wireless unit, the control information message including an indication whether the control information message is directed to the first wireless unit or to the second wireless unit.

2. The method of claim 1, further comprising:
    receiving a first transmission from the first wireless unit on the transmit frequency;
    sending a first signal to the first wireless unit indicating to the first wireless unit to stop transmitting; and
    sending a second signal to the second wireless unit that the second wireless unit can send a second transmission on the transmit frequency.

3. The method of claim 2, further comprising:
    receiving the second transmission from the second wireless unit on the transmit frequency.

4. The method of claim 1, wherein the wireless communication system is a Time Division Multiple Access system.

5. The method of claim 1, wherein the wireless communication system has a Push To Talk mode.

6. A method in a wireless communications system for allowing a first wireless unit and a second wireless unit to share a single communication channel including a transmit frequency and a receive frequency comprising:
    assigning the single communication channel to the first wireless unit and the second wireless unit, so that the first wireless unit and the second wireless unit may alternatively transmit on the transmit frequency, and the first wireless unit may monitor the receive frequency while transmitting on the transmit frequency and the second wireless unit may monitor the receive frequency;
    receiving a first transmission for the first wireless unit on the transmit frequency;
    sending a first signal to the first wireless unit indicating to the first wireless unit to suspend transmission for a predetermined period of time; and
    sending a second signal to the second wireless unit that the second wireless unit can send a second transmission on the transmit frequency during the predetermined period of time.

7. The method of claim 6, further comprising:
    receiving the second transmission from the second wireless unit on the transmit frequency.

8. The method of claim 6, further comprising:
    sending a control information message on the receive frequency to the first wireless unit and the second wireless unit for receipt by the first wireless unit or the second wireless unit, the control information message indicating whether the message is directed to the first wireless unit or to the second wireless unit.

9. The method of claim 6, wherein the wireless communication system is a Time Division Multiple Access system.

10. The method of claim 6, wherein the wireless communication system has a Push To Talk mode.

11. A wireless communications system for allowing a first wireless unit and a second wireless unit to share a single communication channel including a transmit frequency and a receive frequency, comprising:
    means for assigning the single communication channel to the first wireless unit and the second wireless unit, so that the first wireless unit transmits on the transmit frequency, suspends transmission for a predetermined period of time, and resumes transmission after the predetermined period of time and the second wireless unit transmits on the transmit frequency during the predetermined period of time, and so that the first wireless unit may monitor the receive frequency while transmitting on the transmit frequency and the second wireless unit may monitor the receive frequency;
    means for receiving a first transmission from the first wireless unit on the transmit frequency;
    means for sending a first signal to the first wireless unit indicating to the first wireless unit to stop transmitting and for sending a second signal to the second wireless unit that the second wireless unit can send a second transmission on the transmit frequency; and
    means for receiving capable of receiving the second transmission from the second wireless unit on the transmit frequency.

12. The system of claim 11, wherein the wireless communication system is a Time Divisional Multiple Access system.

13. The method of claim 11, wherein the wireless communication system has a Push To Talk mode.

14. A method in a wireless communications system for allowing a first wireless unit to share a single communication channel, including a transmit frequency and a receive frequency, with a second wireless unit, comprising:
    receiving a communication channel assignment from a base station, so that the first wireless unit transmits on the transmit frequency, suspends transmission for a predetermined period of time, and resumes transmission after the predetermined period of time and the second wireless unit transmits on the transmit frequency during the predetermined period of time, and so that the first wireless unit may monitor the receive frequency while transmitting on the transmit frequency and the second wireless unit may monitor the receive frequency;
    receiving a control information message on the receive frequency, the control information message including an indication that the control information message is for the first wireless unit; and receiving a signal indicating that the first wireless unit may transmit on the transmit frequency.

15. The method of claim 14, wherein the wireless communication system is a Time Multiple Access system.

16. The method of claim 14, wherein the wireless communication system has a Push To Talk mode.

17. A method in a wireless communications system for allowing a first wireless unit and a second wireless unit to share a single communication channel including a transmit frequency and a receive frequency, comprising:

assigning the single communication channel to the first wireless unit and the second wireless unit so that the first wireless unit monitors the receive frequency while transmitting on the transmit frequency and the second wireless unit monitors the receive frequency;

designating the first wireless unit as a transmitting unit so that the first wireless unit transmits using the transmit frequency;

receiving a message from the first wireless unit indicating that the first wireless unit has suspended transmission for a predetermined period of time; and in response to receiving the message from the first wireless unit, sending a message to the second wireless unit using the receive frequency indicating that the first wireless unit has suspended transmission for a predetermined period of time so that the second wireless unit can transmit using the transmit frequency for the predetermined time.

18. The method of claim 17, wherein receiving a message from the first wireless unit comprises receiving a discontinuous transmission low signal.

19. A method for allowing a first wireless unit and a second wireless unit to share a single communication channel including a transmit frequency and a receive frequency, comprising:

transmitting on the transmit frequency by the first wireless unit;

monitoring the receive frequency by the first wireless unit while transmitting on the transmit frequency, the receive frequency also monitored by the second wireless unit;

in response to a predetermined event, suspending transmission by the first wireless unit and setting a timer for a predetermined time period, so that the second wireless unit can transmit on the transmit frequency during the predetermined time period; and upon time out of the timer, resuming transmission by the first wireless unit.

20. The method of claim 19, wherein the predetermined event is a break in speech.

21. The method of claim 19, wherein the predetermined even is a discontinuous transmission low signal.

22. The method of claim 19, further comprising:

receiving a control information message on the receive frequency that includes an indication that the control information message is directed to the first wireless unit.

* * * * *

UNITED STATES PATENT AND TRADEMARK OFFICE
CERTIFICATE OF CORRECTION

PATENT NO. : 6,751,468 B1 Page 1 of 1
DATED : June 15, 2004
INVENTOR(S) : Heubel et al.

It is certified that error appears in the above-identified patent and that said Letters Patent is hereby corrected as shown below:

<u>Column 10,</u>
Line 24, "even is a" should read -- event is a --

Signed and Sealed this

Twenty-first Day of December, 2004

JON W. DUDAS
*Director of the United States Patent and Trademark Office*